United States Patent [19]

Hanning et al.

[11] Patent Number: 5,292,464
[45] Date of Patent: Mar. 8, 1994

[54] METHOD OF INSULATING A WATER HEATER AND PREVENTING FLASH USING A FOAM STOP

[75] Inventors: David M. Hanning; Gordon W. Stretch, both of Montgomery, Ala.

[73] Assignee: Rheem Manufacturing Company, New York, N.Y.

[21] Appl. No.: 934,957

[22] Filed: Aug. 25, 1992

[51] Int. Cl.$^5$ .................................. B29C 67/22
[52] U.S. Cl. .................. 264/46.5; 264/46.9; 264/276
[58] Field of Search .......... 264/46.4, 46.5, 46.9, 264/46.6, 276

[56] References Cited
U.S. PATENT DOCUMENTS

| | | | |
|---|---|---|---|
| 4,081,879 | 4/1978 | Robright | 16/2 |
| 4,159,035 | 6/1979 | Chartet | 165/173 |
| 4,191,244 | 3/1980 | Keske | 165/69 |
| 4,447,377 | 5/1984 | Denton | 264/46.9 |
| 4,477,399 | 10/1984 | Tilton | 264/45.2 |
| 4,628,184 | 12/1986 | West | 219/312 |
| 4,790,290 | 12/1988 | Chevalier et al. | 126/361 |
| 4,878,482 | 11/1989 | Pfeffer | 126/375 |
| 4,968,465 | 11/1990 | Rhodes, Jr. | 264/276 |
| 4,992,223 | 2/1991 | Nelson | 264/46.9 |
| 5,000,893 | 3/1991 | West et al. | 264/46.5 |
| 5,023,031 | 6/1991 | West et al. | 264/46.5 |
| 5,052,346 | 10/1991 | Beck | 122/494 |
| 5,117,810 | 6/1992 | Threatt | 126/361 |

Primary Examiner—Allan R. Kuhns
Attorney, Agent, or Firm—Konneker Bush & Hitt

[57] ABSTRACT

The storage tank portion of a water heater has an outwardly projecting threaded pipe coupling fitting and is disposed within a jacket structure that forms an enclosed insulation space around the storage tank, the outer end of the pipe coupling fitting being spaced inwardly apart from a pipe connection opening in the jacket structure. A generally tubular foam stop member having a convexly curved side portion is positioned within the insulation space before the space is filled by an injection process with a liquid foam insulation material. The foam stop member receives the pipe coupling, is axially pressed between the storage tank and the jacket structure, and forms a seal around the pipe coupling fitting and around the jacket structure pipe connection opening. During injection of the liquid foam insulation material into the enclosed insulation space, the foam stop member serves as a relatively small barrier that essentially precludes the liquid foam from escaping outwardly through the jacket structure pipe connection opening or entering the pipe coupling.

5 Claims, 2 Drawing Sheets

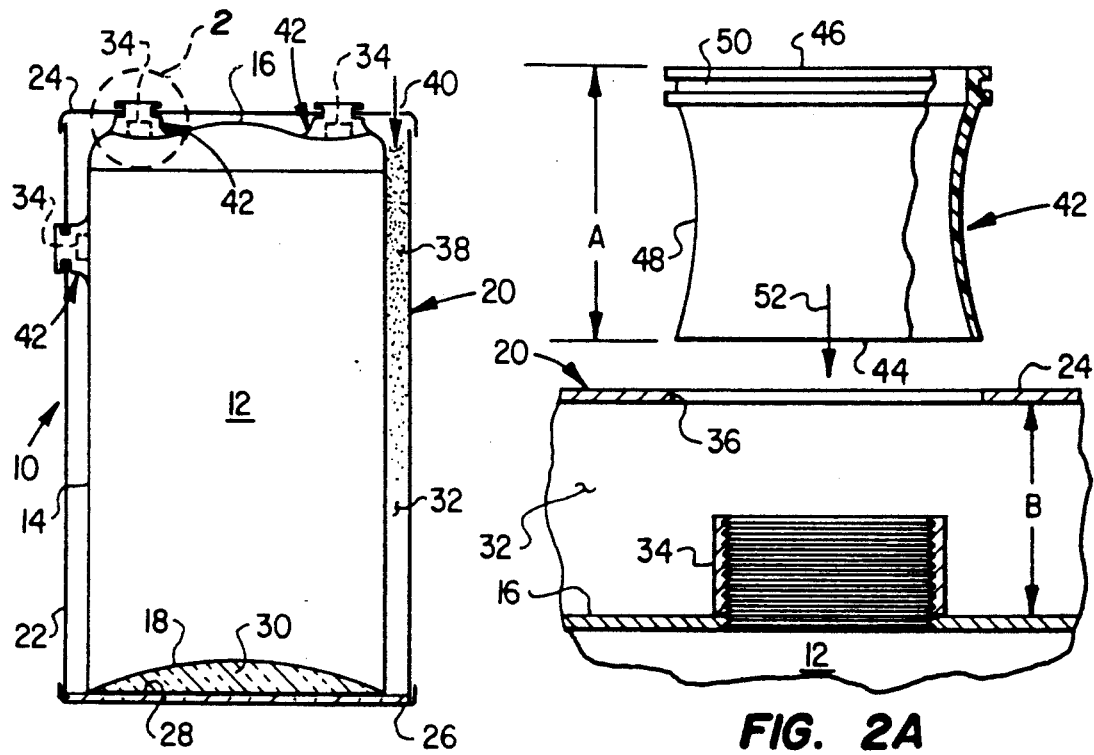
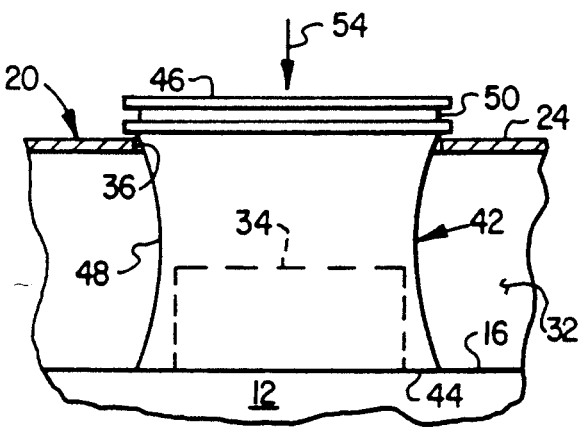
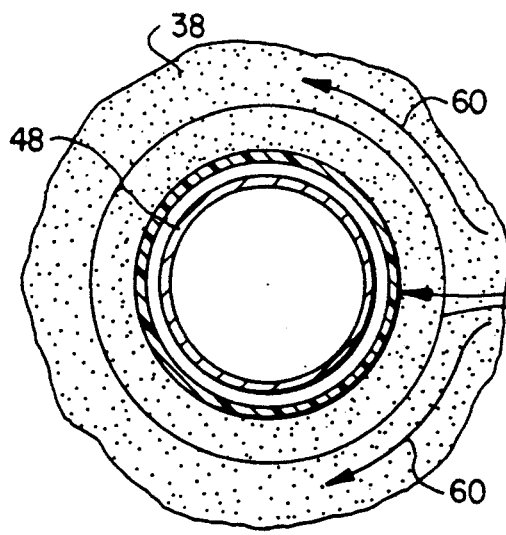
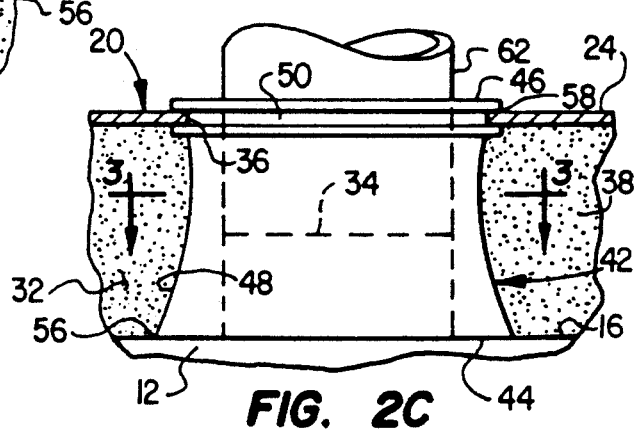
FIG. 1
FIG. 2A
FIG. 2B
FIG. 3
FIG. 2C

METHOD OF INSULATING A WATER HEATER AND PREVENTING FLASH USING A FOAM STOP

BACKGROUND OF THE INVENTION

The present invention generally relates to the fabrication of water heaters, and more particularly relates to the installation of an externally jacketed foam insulation structure around the storage tank portion of a water heater.

Modern water heaters typically include a storage tank portion adapted to hold a quantity of heated water for on-demand supply to plumbing fixtures such as sinks,, tubs, and showers. Projecting outwardly from the storage tank are pipe coupling fittings threadingly connectable to a cold water inlet pipe, a hot water supply pipe, and a temperature/pressure relief pipe. The storage tank is externally insulated by injecting liquid insulating foam into an enclosed insulation space formed between the exterior surface of the storage tank and an external jacket structure disposed outwardly around the storage tank. Piping connections to the storage tank couplings are made through openings formed in the jacket which are spaced outwardly from the couplings in facing relationships with their outer ends.

During the insulating foam injection process it is necessary to prevent the foam from escaping outwardly through the jacket structure pipe connection openings and/or entering the open outer ends of the storage tank pipe coupling fittings. Using conventional methods, this is typically accomplished in two ways. The first method is to provide a fiberglass block having holes formed therethrough to receive the storage tank couplings, position the block against the storage tank exterior with the couplings received in the block holes, and then install the jacket structure. During subsequent injection of the insulating foam the fiberglass block serves as a barrier within the enclosed insulating space to prevent the foam from being forced out through the jacket structure pipe connection openings or entering the storage couplings.

While this is a relatively simple and straightforward approach to forming foam stop barriers, it has two primary disadvantages. First, the fiberglass block must be very carefully sized to sealingly extend between the outer surface of the storage tank and the inner surface of the jacket structure. If even a slight gap exists around the installed block it can easily permit the injected foam to escape from the jacket structure or enter the pipe couplings.

Second, the fiberglass block, which tends to be relatively large, typically has a thermal insulation value only about half that of the insulating foam. Accordingly, relative to the foam insulation, the fiberglass block forms a relatively low resistance heat outflow path in the assembled water heater. As energy conservation goals and standards continue to increase, this situation becomes less and less acceptable.

The other method conventionally used to form a foam stop barrier around the tank couplings and their associated jacket structure pipe connection openings has been to construct a relatively flat, foam-filled bag having openings therein through which the tank couplings may be extended, taping the bag blanket-like to the tank exterior, and then installing the jacket structure over the bag. Since the bags are filled with foam insulation, they do not present the heat leak problem that the fiberglass blocks do. However, like the fiberglass blocks, the foam filled bags present the potential problem of injected foam leakage past the bags if they are not carefully sized and properly fitted into place within the enclosed insulation space before the foam injection process is initiated. Additionally, the bags are rather tedious and time consuming to fabricate and install, thus undesirably increasing the overall construction cost of the water heater.

It can be readily be seen from the foregoing that a need exists for improved foam stop apparatus and methods in the fabrication of externally foam-insulated water heaters. It is accordingly an object of the present invention to provide such improved foam stop apparatus and methods.

SUMMARY OF THE INVENTION

In carrying out principles of the present invention, in accordance with a preferred embodiment thereof, a water heater is insulated using a foam insulations material injected in liquid form into-an enclosed insulation space defined between the storage tank portion of the water heater and an external jacket structure fitted over the storage tank. The storage tank has a spaced plurality of pipe fitting couplings projecting outwardly therefrom, each of the couplings being spaced inwardly apart from and facing an associated pipe connection opening extending through the jacket structure.

During injection of the liquid foam into the enclosed insulation space, escape of the foam outwardly through the pipe connection openings and entry of the foam into the pipe coupling fittings are essentially precluded using specially designed foam stop members which are installed within the insulation space prior to the injection of the liquid foam thereinto.

The foam stop members have generally tubular configurations, are formed from a relatively thin resilient material such as plastic, rubber or neoprene, and have laterally indented axial sections configured to facilitate a resilient axial compression of the members. Each of the installed foam stop members is axially pressed between the storage tank and the jacket structure and has a first end portion axially receiving one of the pipe coupling fittings and forming a seal on the storage tank around the coupling, and a second end portion forming a seal around the jacket structure pipe connection opening associated with the pipe coupling fitting.

In one embodiment thereof, each of the foam stop members has an axial length slightly greater than the distance between the storage tank and the jacket structure as measured from adjacent a pipe coupling fitting to adjacent its associated pipe connection opening, a convexly curved side wall portion, opposite first and second ends, and an annular exterior surface groove formed in its second end. The foam stop member is operatively installed within the enclosed insulation space by inserting the member, first end first, inwardly through one of the jacket structure pipe connections until the first end receives the underlying pipe coupling fitting and contacts an annular storage tank area around the received coupling.

At this point, the second end of the foam stop member is positioned slightly outwardly of the exterior surface of the jacket structure. Finally, the inserted foam stop member is axially compressed against the storage tank to cause a circular peripheral edge portion of the jacket structure around the pipe connection opening to snap into the annular groove in the second end of the foam stop member. This maintains the resilient foam stop member in axial compression between the storage tank and the jacket structure with the compressed foam stop member receiving the pipe fitting coupling and forming annular edge seals around the coupling and its associated pipe connection opening.

In another embodiment of the foam stop member, used on the top end of the storage tank, the first end of each foam stop member is placed over its associated pipe coupling fitting before the top pan portion of the jacket structure is operatively secured to the open top end of the cylindrical side wall portion of the jacket structure. Annular lip portions projecting from the underside of the top pan around its pipe connection openings are then inserted downwardly into the foam stop members. The top pan is then pressed downwardly, to axially compress the foam stop members, and operatively secured to the top end of the side wall portion of the jacket structure. With the top pan installed, the top end surfaces of the foam stop members press against the underside of the top pan, forming annular edge seals around its annular lip portions, and the bottom end surfaces of the foam stop members press against the top end of the storage tank, forming annular edge seals around the pipe coupling fittings.

BRIEF DESCRIPTION OF THE DRAWINGS

FIG. 1 is a schematic, partly elevational cross-sectional view through a representative water heater being insulated with an injected foam material, the water heater incorporating therein specially designed foam stop members embodying principles of the present invention;

FIGS. 2A-2C are enlargements of the circled area "2" in FIG. 1 and sequentially illustrate the operative installation of one of the foam stop members;

FIG. 3 is a cross-sectional view through the installed foam stop member taken along line 3—3 of FIG. 2C.

DETAILED DESCRIPTION

Figure 4A:
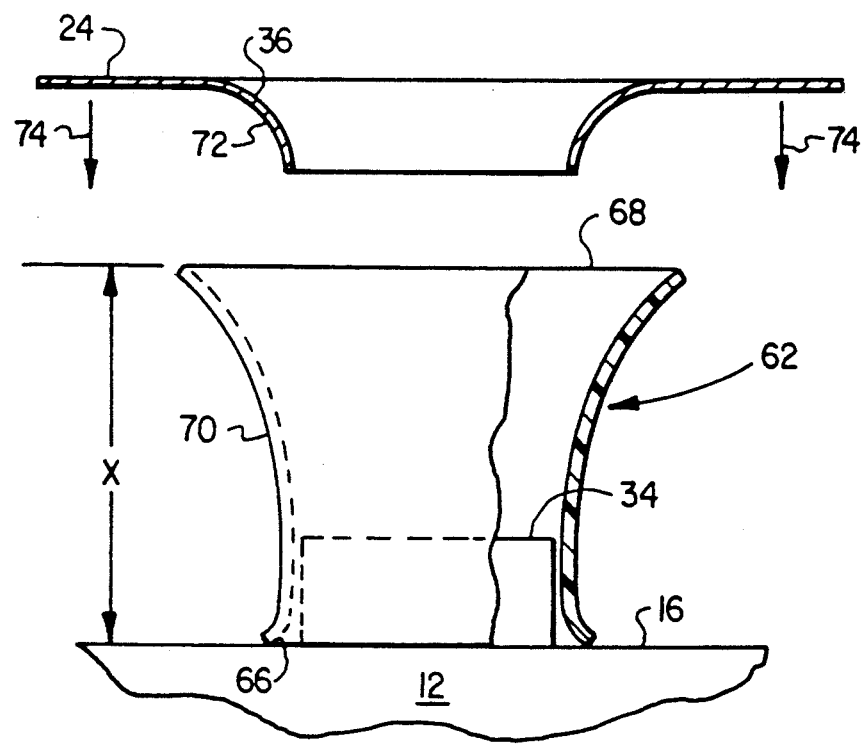
FIGS. 4A and 4B are partially elevational cross-sectional views through a top end portion of the water heater and sequentially illustrate the operative installation therein of an alternate embodiment of the foam stop member.

Schematically illustrated in FIG. 1 is a representative water heater 10 which includes a storage tank 12 adapted to hold a supply of heated water for on-demand delivery to various plumbing fixtures such as sinks, tubs, showers and the like. Water disposed in the storage tank is maintained at a predetermined supply temperature by conventional fuel-fired or electric heating means (not shown). The storage tank 12 has a vertically oriented cylindrical body portion 14, an upwardly domed head plate 16, and an upwardly domed bottom head 18.

Surrounding the storage tank 12 is an outer jacket structure 20 having an open-ended cylindrical body portion 22 with a top pan 24 secured to its upper end, and a bottom pan 26 secured to its lower end. The bottom end of the storage tank 12 rests upon a fiberglass pad 28 positioned in the bottom pan 26, and the space between the bottom head 18 and the pad 28 is filled with a fiberglass insulation material 30.

Referring now to FIGS. 1 and 2A, the jacket structure 20 forms an enclosed insulation space 32 that horizontally circumscribes the storage tank 12 and extends across its top end. Disposed within the insulation space are three threaded pipe coupling fittings 34 which project outwardly from the storage tank 12 and communicate with its interior. Representatively, two of the couplings 34 are spaced apart on the top plate 16 and are connectable to a cold water inlet pipe and a hot water supply pipe, and the other coupling 34 is positioned on the side of the storage tank near its top end and is connectable to a temperature/pressure relief pipe. The outer end of each coupling 34 is spaced inwardly apart from, and aligned with a circular pipe connection opening 36 (see FIG. 2A) in the jacket structure 20. When the water heater is to be operatively connected to the fixture system which it serves, the necessary water pipes may be extended inwardly through the jacket openings 36 and threadingly connected to their associated storage tank couplings 34.

After the jacket structure 20 is secured in place about the storage tank 12, the enclosed insulation space 32 is filled with a suitable liquid foam insulation material 38 injected downwardly into the space 32 through an opening 40 formed in the top pan 24. After the space 32 is filled with the foam insulation 38 the opening 40 is suitably capped off.

Escape of the pressurized liquid foam 38 outwardly through the jacket openings 36 and entry of the foam into the outer ends of the tank couplings 34 are prevented using specially designed snap-in foam stop members 42 that embody principles of the present invention. Referring now to FIG. 2A, each of the foam stop members 42 is formed from a relatively thin resilient material, such as plastic, rubber or neoprene, and has a generally tubular configuration with an open inner end 44, an open outer end 46, and a concavely curved side wall portion 48 extending between the ends 44 and 46. The laterally indented side wall portion 48 serves to facilitate axial compression of the foam stop member 42 for purposes later described.

As indicated in FIG. 2A, the axial length A of the representative foam stop member 42 is slightly longer than the distance B between the top head 16 and the top pan 24 as measured adjacent the tank coupling 34; the diameter of the outer stop member end 46 is slightly greater than the diameter of the illustrated jacket opening 36; the circular inner end 44 of the foam stop member 42 is sized to be inserted inwardly through the jacket opening 36; and an annular exterior surface groove 50 is formed in the outer stop member end 46 and circumscribes the axis of the stop member.

After the jacket structure 20 is secured around the storage tank 12, but before the injection of the insulating foam 38 into the enclosed insulation space 32, each of the foam stop members 42 is operatively installed within the insulation space 32 simply by snapping the stop member in place around an associated tank coupling 34 as will now be described with reference to FIGS. 2A-2C.

To achieve this simple and quite rapid snap-in installation of each of the foam stop members 42, each of the stop members 42 is first inserted, inner end first, inwardly through one of the jacket openings 36, as indicated by the arrow 52 in FIG. 2A, until the inner end 44 of the stop member 42 contacts the storage tank 12, with the inner stop member end 44 receiving the associated tank coupling 34 as shown in FIG. 2B.

At this point, the annular stop member outer end groove 50 is positioned slightly outwardly of the jacket opening 36 due to the fact that the stop member length A, as previously mentioned, is slightly longer than the insulation space dimension B. Next, as indicated by the arrow 54 in FIG. 2B, the inserted stop member 42 is pushed against the storage tank 12 to axially compress the stop member, causing its lower end 44 to flare outwardly against the storage tank and also causing a peripheral portion of the jacket structure 20 around the circular pipe connection opening 36 to snap into the annular stop member groove 50 as shown in FIG. 2C.

With the stop member 42 snapped into place in this manner, it is held in axial compression within the insulation space 32, with the bottom end of the stop member 42 forming an annular exterior surface edge seal 56 on the storage tank 12 outwardly around the tank coupling 34 (see FIG. 2C), and an annular edge seal 58 around the periphery of the jacket opening 36. After all of the foam stop members 42 have been snapped into place at their associated tank coupling and jacket opening pairs 34,36 the liquid foam insulating material 38 is injected into the enclosed insulation space 32 to fill it with insulation.

As the pressurized liquid foam insulation material 38 is forced into the insulation space 32, as indicated by the arrows 60 in FIG. 3, the foam flows around the installed foam stop members 42 which serve as relatively small barriers that preclude the foam from being forced outwardly through the jacket openings 36 and/or entering the open outer ends of the storage tank couplings 34. After the injected liquid foam insulating material has hardened, the necessary external pipes (such as the representative pipe 62 shown in FIG. 2C) may be inserted inwardly through the jacket openings 36, and the interiors of the foam stop members 42, and threadingly connected to their associated storage tank couplings 34.

The use of the foam stop members 42 of the present invention provides several advantages over conventional foam stop structures such as fiberglass blocks and foam-filled blankets taped to the storage tank. For example, the stop members 42 may be rapidly snapped into place after the jacket structure is installed, with no particular degree of fabrication skill being required. Additionally, since the stop members are sized to be held in axial compression within the enclosed jacket insulation, tight edge seals are automatically formed around the tank couplings and the jacket openings, thereby essentially eliminating the potential foam leakage problems present in conventional foam stop structures.

As an added advantage, the axial oversizing of the stop members with respect to their corresponding insulation space dimensions automatically compensates for dimensional deviations in such insulation dimensions. Moreover, the installed foam stop members 42 create only minimal heat leak areas in the overall water heater. For example, it can be seen in FIG. 1 that after the injected liquid foam insulating material 38 has hardened, it will cover the entire top side of the storage tank 12, including the space between the two top tank couplings 34, with the exception of the two very small foam barrier volumes defined by the insulation-encapsulated foam stop members 34 on top of the storage tank 12.

Figure 4B:
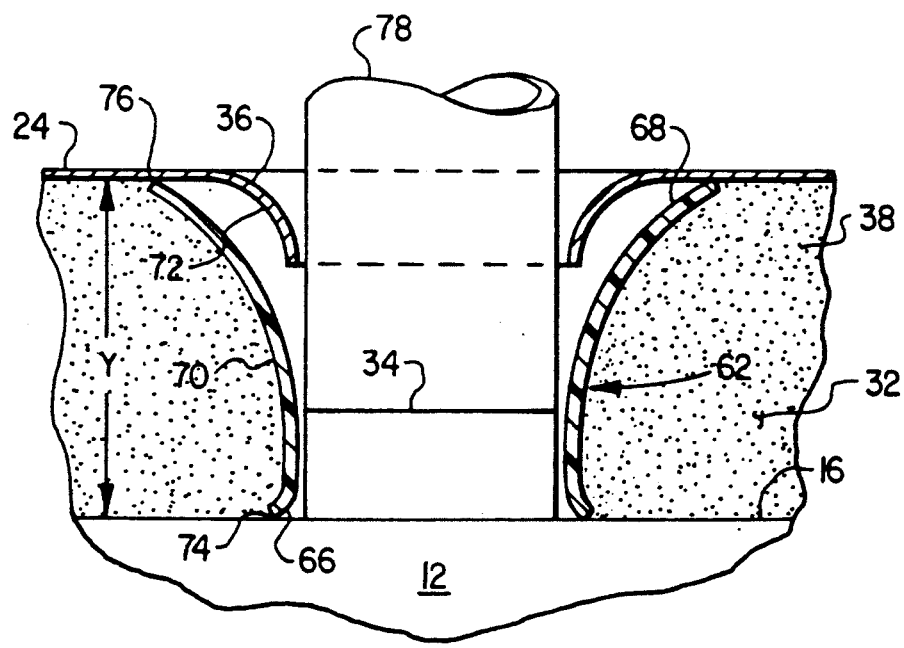

An alternate embodiment 64 of the previously described foam stop member 42 is illustrated in FIGS. 4A and 4B. Like the foam stop member 42, the foam stop member 64 has a generally tubular configuration, is formed from a relatively thin resilient material such as plastic, rubber or neoprene, and has an open circular inner end 66, an open circular outer end 68, and a concavely curved side wall portion 70. As illustrated, the open outer end 68 has a diameter larger than that of the open inner end 66.

A pair of the foam stop members 62 are used in conjunction with the two couplings 34 positioned atop the storage tank 12, in place of the previously described foam stop members 42, and have axial lengths X longer than the distance Y between the installed top pan 24 and the storage tank top plate 16. When the foam stop members 62 are provided in place of the foam stop members 42, the top pan 24 is provided with inwardly projecting annular lip portions 72 extending around its pipe connection openings 36.

Prior to the installation of the top pan 24, the inner end 66 of each foam stop member 62 is positioned over one of the tank couplings 34 and engaged with the top head 16 as illustrated in FIG. 4A. The top pan is then positioned over the foam stop members 62, with the annular lips 72 centered over the open outer ends 68 of the foam stop members 62. The top pan 24 is then pushed downwardly, as indicated by the arrows 74 in FIG. 4A, to cause the lips 72 to enter the outer ends 68 of the foam stop members 62 and is operatively secured to the upper end of the jacket structure body portion 22 (see FIG. 1).

The installed top pan 24 is positioned upwardly apart from the storage tank top head 16 by the distance Y, thereby axially compressing each of the foam stop members 62 between the top pan 24 and the top head 16 and causing the outer end 68 of each foam stop member 62 to flare outwardly as indicated in FIG. 4B. Each of the axially compressed foam stop members 62 forms an annular edge seal 74 on the top head 16 around its associated tank coupling 34, and also forms an annular edge seal 76 on the underside of the top pan 24 outwardly around its associated pipe connection opening 36.

As the foam insulating material 38 is injected into the enclosed insulation space 32, each of the axially compressed foam stop members 62 serves as a relatively small barrier that essentially precludes the foam from outwardly escaping through the top pan openings 36 and/or entering the open outer ends of the top tank couplings 34. After the injected foam 38 hardens, the necessary pipes (such as the representative pipe 78 shown in FIG. 4B) may be inserted through the top pan openings 36 and the interiors of the foam stop members 62 and threadingly connected to their associated top tank couplings 34.

The foregoing detailed description is to be clearly understood as being given by way of illustration and example only, the spirit and scope of the present invention being limited solely by the appended claims.

What is claimed is:

1. A method of thermally insulating the storage tank of a water heater, said method comprising the steps of:
    operatively positioning a jacket structure outwardly around said storage tank to define a hollow, enclosed insulation space that extends externally around said storage tank, the operatively positioned jacket structure having a pipe opening therein;
    providing a hollow, generally tubular foam stop member formed from a relatively thin resilient material;
    installing said foam stop member within said enclosed insulation space by axially inserting said foam stop member inwardly through said jacket structure pipe opening in a manner creating a snap-fitted engagement between the inserted foam stop member and said jacket structure and axially compressing said foam stop member between said storage tank and said jacket structure; and injecting a liquid foam insulation material into said enclosed insulation space to essentially fill it with insulation, the installed foam stop member serving as a relatively small barrier that essentially precludes the injected liquid foam insulation material from escaping outwardly through said jacket structure pipe opening.

2. A method of thermally insulating the storage tank portion of a water heater, said storage tank portion having an outwardly projecting threaded pipe coupling fitting secured thereto and having an outer end, said method comprising the steps of:

operatively positioning a jacket structure outwardly around said storage tank portion to define a hollow, enclosed insulation space that extends externally around said storage tank portion, the operatively positioned jacket structure having a pipe connection opening therein which is spaced outwardly apart from the outer end of said pipe coupling fitting in an opposed relationship therewith, said pipe connection opening having a circular shape;

providing a hollow foam stop member formed from a relatively thin resilient material, said hollow foam stop member having first and second open end portions spaced apart along an axis, an axial length, and a side wall portion extending between said first and second open end portions and outwardly circumscribing said axis, said side wall portion having a laterally indented axial section operative to facilitate a resilient axial compression of said foam stop member, the axial length of said foam stop member being slightly greater than the distance between said storage tank portion and said jacket structure as measured from said adjacent said pipe coupling fitting to adjacent said pipe connection opening, said second end portion of said foam stop member having an annular exterior surface groove formed therein and circumscribing said axis;

installing said foam stop member within said enclosed insulation space in a manner such that said foam stop member receives said pipe coupling fitting, and is axially pressed between said storage tank portion and said jacket structure, with said first end portion of said foam stop member forming a seal on said storage tank portion around said pipe coupling fitting, and said second end portion of said foam stop member forming a seal on said jacket structure around said pipe connection opening, said installing step including the steps of:

axially inserting said foam stop member, first end portion first, inwardly through said pipe connection opening in a manner causing said first end portion to receive said pipe coupling fitting and engage said storage tank portion around said pipe coupling fitting, and axially compressing the inserted foam stop member against said storage tank portion in a manner causing a circular edge portion of said jacket structure around said pipe connection opening to snap into said annular exterior surface groove in said second end portion of said foam stop member; and injecting a liquid foam insulation material into said enclosed insulation space to essentially fill it with insulation, the installed foam stop member serving as a relatively small barrier that essentially precludes the injected liquid foam insulation material from escaping outwardly through said pipe connection opening or entering said pipe coupling fitting, and defining a passage through which a pipe may be inwardly extended and threadingly connected to said pipe coupling fitting.

3. A method of thermally insulating the storage tank portion of a water heater, said storage tank portion having an outwardly projecting threaded pipe coupling fitting secured thereto and having an outer end, said method comprising the steps of:

operatively positioning a jacket structure outwardly around said storage tank portion to define a hollow, enclosed insulation space that extends externally around said storage tank portion, the operatively positioned jacket structure having a pipe connection opening therein which is spaced outwardly apart from the outer end of said pipe coupling fitting in an opposed relationship therewith, said jacket structure having a lip portion projecting inwardly from its interior surface from around the periphery of said pipe connection opening;

providing a hollow foam stop member formed from a relatively thin resilient material, said hollow foam stop member having first and second open end portions spaced apart along an axis, and a side wall portion extending between said first and second open end portions and outwardly circumscribing said axis, said side wall portion having a laterally indented axial section operative to facilitate a resilient axial compression of said foam stop member, said foam stop member having an axial length slightly greater than the distance between said storage tank portion and said jacket structure as measured from adjacent said pipe coupling fitting to adjacent said pipe connection opening;

installing said foam stop member within said enclosed insulation space in a manner such that said foam stop member receives said pipe coupling fitting, and is axially pressed between said storage tank portion and said jacket structure, with said first end portion of said foam stop member forming a seal on said storage tank portion around said pipe coupling fitting, and said second end portion of said foam stop member forming a seal on said jacket structure around said pipe connection opening, said positioning and installing steps including the sequentially performed steps of:

positioning said first end portion of said foam stop member against said storage tank portion with said pipe coupling fitting extending inwardly through said first end portion, inserting said jacket structure lip portion inwardly into said second end portion of said foam stop member, and using said jacket structure to cause said foam stop member to be axially pressed between said storage tank portion and said jacket structure; and injecting a liquid foam insulation material into said enclosed insulation space to essentially fill it with insulation, the installed foam stop member serving as a relatively small barrier that essentially precludes the injected liquid foam insulation material from escaping outwardly through said pipe connection opening or entering said pipe coupling fitting, and defining a passage through which a pipe may be inwardly extended and threadingly connected to said pipe coupling fitting.

4. A method of thermally insulating the storage tank of a water heater, said storage tank having an opening therein to which a water pipe may be operatively connected, said method comprising the steps of:

operatively positioning a jacket structure outwardly around said storage tank to define a hollow, enclosed insulation space that extends externally around said storage tank, the operatively positioned jacket structure having an opening therein which is spaced outwardly apart from said storage tank opening in an opposed relationship therewith;

providing a hollow, generally tubular foam stop member formed from a relatively thin resilient material, said foam stop member being axially compressible and having first and second open end portions, and a side wall portion extending between said first and second end portions;

installing said foam stop member within said enclosed insulation space in a manner such that said foam stop member is axially pressed between said storage tank and said jacket structure, with said first end portion of said foam stop member forming an edge seal on said storage tank around said opening therein, and said second end portion of said foam stop member forming an edge seal on said jacket structure around said opening therein, said installing step including the steps of:

forming an exterior surface groove in said second end portion of said foam stop member laterally around its periphery, inserting said foam stop member, first end portion first, inwardly through said jacket structure opening to bring said first end portion into contact with said storage tank around said opening therein, and axially compressing the inserted foam stop member against said storage tank in a manner causing a peripheral portion of said jacket structure circumscribing said opening therein to snap into said exterior surface groove of said second end portion of said foam stop member; and injecting a liquid foam insulation material into said enclosed insulation space to essentially fill it with insulation, the installed foam stop member serving as a relatively small barrier that essentially precludes the injected liquid foam insulation material from escaping outwardly through said jacket structure opening or entering said storage tank opening.

5. A method of thermally insulating the storage tank of a water heater, said storage tank having an opening therein to which a water pipe may be operatively connected, said method comprising the steps of:

operatively positioning a jacket structure outwardly around said storage tank to define a hollow, enclosed insulation space that extends externally around said storage tank, the operatively positioned jacket structure having an opening therein which is spaced outwardly apart from said storage tank opening in an opposed relationship therewith, said jacket structure having a lip portion projecting inwardly from its interior surface around said opening therein;

providing a hollow, generally tubular foam stop member formed from a relatively thin resilient material, said foam stop member being axially compressible and having first and second open end portions, and a side wall portion extending between said first and second end portions;

installing said foam stop member within said enclosed insulation space in a manner such that said foam stop member is axially pressed between said storage tank and said jacket structure, with said first end portion of said foam stop member forming an edge seal on said storage tank around said opening therein, and said second end portion of said foam stop member forming an edge seal on said jacket structure around said opening therein, said operatively positioning and installing steps including the sequentially performed steps of:

positioning said first end portion of said foam stop member against said storage tank around said opening therein, inserting said jacket structure lip portion inwardly into said second end portion of said foam stop member, and using said jacket structure to cause said foam stop member to be axially pressed between said storage tank and said jacket structure; and injecting a liquid foam insulation material into said enclosed insulation space to essentially fill it with insulation, the installed foam stop member serving as a relatively small barrier that essentially precludes the injected liquid foam insulation material from escaping outwardly through said jacket structure opening or entering said storage tank opening.

* * * * *